(12) United States Patent
Bowman

(10) Patent No.: US 10,532,683 B1
(45) Date of Patent: Jan. 14, 2020

(54) VEHICLE TABLE

(71) Applicant: John Bowman, Pittsburgh, PA (US)

(72) Inventor: John Bowman, Pittsburgh, PA (US)

( * ) Notice: Subject to any disclaimer, the term of this patent is extended or adjusted under 35 U.S.C. 154(b) by 0 days.

(21) Appl. No.: 16/223,809

(22) Filed: Dec. 18, 2018

(51) Int. Cl.
| | | |
|---|---|---|
| *B60N 3/00* | (2006.01) | |
| *B60J 7/14* | (2006.01) | |
| *B60R 9/06* | (2006.01) | |
| *B62D 33/027* | (2006.01) | |

(52) U.S. Cl.
CPC .............. *B60N 3/001* (2013.01); *B60J 7/141* (2013.01); *B60R 9/06* (2013.01); *B62D 33/0273* (2013.01)

(58) Field of Classification Search
CPC ...................................................... B60N 3/001
USPC .............................................................. 108/4
See application file for complete search history.

(56) References Cited

U.S. PATENT DOCUMENTS

| | | | |
|---|---|---|---|
| 3,669,031 A | 6/1972 | Cole | |
| 4,005,898 A | 2/1977 | Way | |
| 4,995,322 A * | 2/1991 | Frederick | A47B 5/06 108/38 |
| 5,090,335 A | 2/1992 | Russell | |
| 5,533,771 A * | 7/1996 | Taylor | B60P 1/435 108/44 |
| 5,730,066 A * | 3/1998 | Auten | B60N 3/001 108/44 |
| 5,823,595 A * | 10/1998 | Tronco | B60P 3/14 296/26.03 |
| 6,045,172 A * | 4/2000 | Thomas | B62D 33/0273 108/44 |
| 6,065,792 A | 5/2000 | Sciullo et al. | |
| 6,739,265 B1 * | 5/2004 | Badger | F42B 1/00 102/275.11 |
| 7,159,917 B2 | 1/2007 | Haaberg | |
| 7,309,202 B1 * | 12/2007 | Anderson | B60P 1/431 108/44 |
| 7,628,439 B1 * | 12/2009 | Strong | B62D 33/0273 108/44 |
| 9,956,996 B2 * | 5/2018 | Astrike | B60P 7/02 |
| 10,308,292 B1 * | 6/2019 | Shedden | B62D 33/03 |
| 2006/0071498 A1 * | 4/2006 | Taylor | B60N 2/345 296/26.09 |
| 2011/0247530 A1 * | 10/2011 | Coffman | A47B 3/0911 108/116 |
| 2013/0341949 A1 | 12/2013 | Bernthisel | |
| 2014/0083335 A1 * | 3/2014 | Mayhood | A47C 17/645 108/18 |
| 2018/0050642 A1 * | 2/2018 | Waddell | B60R 5/045 |
| 2018/0072208 A1 * | 3/2018 | Howe | A47B 3/08 |

\* cited by examiner

*Primary Examiner* — Daniel J Rohrhoff
(74) *Attorney, Agent, or Firm* — Ballard Spahr LLP

(57) ABSTRACT

A table attachable to the tailgate of a vehicle extends from the tailgate. The table is foldable between a stowed and a deployed configuration. In the stowed configuration the table can be folded against the vehicle tailgate or extend transverse to the tailgate and securable to the vehicle. In the deployed configuration the table when extended in the plane of the tailgate forms a surface.

14 Claims, 5 Drawing Sheets

VEHICLE TABLE

FIELD OF THE INVENTION

This invention relates to a table that extends from a vehicle tailgate and also acts as a cover for the bed.

BACKGROUND

Pickup trucks are used for passenger transport, agriculture, commercial, recreation, law enforcement, and fire service applications. For all these activities cargo is often transported within the bed of the pickup truck. In agriculture, commercial, recreation, law enforcement and fire services the cargo may include equipment. Once the pickup truck transports the equipment to the destination, the user or users may require a surface on which to unload, display, stage or use the equipment. Alternatively the surface may be used to conduct meetings, review drawings, process paperwork or act as a mobile work desk to mount a laptop for example. In addition to the surface, the equipment within the pickup truck bed may need to be covered to protect it from the environment and theft.

There is clearly an opportunity to provide a work surface and provide protection for the cargo including equipment contained within the bed of a pickup truck. By using a table attachable to the tailgate of a vehicle extending from the tailgate in two configurations, first, a surface can be created and used for work or staging and using equipment; and second, the surface can be used to cover and protect the cargo from the environment and theft.

SUMMARY

This invention concerns a table that extends from a vehicle tailgate and also acts as a cover for the vehicle bed. In one embodiment the table is attachable to a tailgate of a vehicle. The table comprises a plurality of panels. The plurality of panels are hingedly attached to one another. A first one of the panels is hingidly attached to the tailgate. The panels are foldable relative to one another, between a stowed configuration and a deployed configuration. The plurality of panels form a surface which extends from the tailgate.

In an example, in the stowed configuration, the panels are accordion folded to lie in facing relation to one another.

In another example, the table further comprises at least one leg attached to at least one of the plurality of panels. As an example the at least one leg is attached to a panel distal to the tailgate. As an example the at least one leg is hingedly attached to the panel distal to the tailgate.

In yet another example, the table further comprises two legs attached to at least one of the plurality of panels. As an example the two gets are attached to a panel distal to the tailgate. As an example the two legs are hingedly attached to the panel distal to the tailgate.

In an example, in the stowed configuration the plurality of panels extend transversely to the tailgate. In this example the plurality of panels are securable to the vehicle. Also in this example the plurality of panels are securable to the vehicle along edges oriented perpendicular to axes of fold lines between the panels.

In an example, in the deployed configuration the plurality of panels extend in the plane of the tailgate.

In yet another example, in the stowed configuration the plurality of panels are securable to the vehicle.

In a further example, the plurality of panels are hingedly attached edge to edge. In this example, the edges are oriented parallel to axes of fold lines between the panels.

As an example, at least one of the plurality of panels further comprises a rectangular plate. As an example the plurality of panels further comprises a frame surrounding the rectangular plate.

In another embodiment a vehicle comprises a platform, first and second sides, a tailgate, and a table. The first and second sides extend transversely to the platform and are in spaced relation to one another on opposite sides of the platform. The tailgate is hingedly attached to the platform between the first and second sides. The table is hingedly attached to the tailgate. The table comprises a plurality of panels hingedly attached to one another. The first one of the panels are hingedly attached to the tailgate. The panels are foldable relative to one another, between a stowed configuration and a deployed configuration. The plurality of panels form a surface extending from the tailgate.

In an example, in the stowed configuration, the panels are accordion folded to lie in facing relation to one another.

In another example, the table further comprises at least one leg attached to at least one of the plurality of panels. As an example the at least one leg is attached to a panel distal to the tailgate. As an example the at least one leg is hingedly attached to the panel distal to the tailgate.

In yet another example, the table further comprises two legs attached to at least one of the plurality of panels. As an example the two gets are attached to a panel distal to the tailgate. As an example the two legs are hingedly attached to the panel distal to the tailgate.

In an example, in the stowed configuration the plurality of panels extend transversely to the tailgate. In this example the plurality of panels are securable to the vehicle. Also in this example the plurality of panels are securable to the vehicle along edges oriented perpendicular to axes of fold lines between the panels.

In an example, in the deployed configuration the plurality of panels extend in the plane of the tailgate.

In yet another example, in the stowed configuration the plurality of panels are securable to the vehicle.

In a further example, the plurality of panels are hingedly attached edge to edge. In this example, the edges are oriented parallel to axes of fold lines between the panels.

As an example, at least one of the plurality of panels further comprises a rectangular plate. As an example the plurality of panels further comprises a frame surrounding the rectangular plate.

DETAILED DESCRIPTION

This invention concerns a table that extends from a vehicle tailgate and also acts as a cover for the vehicle bed.

Figure 1:
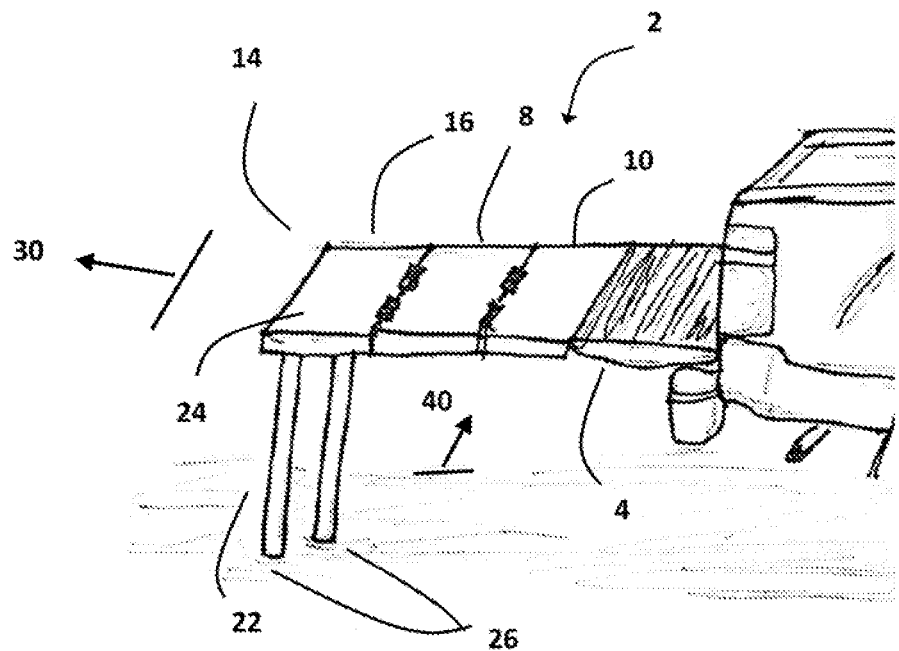
FIG. 1 is an isometric view of an example embodiment of a table in a deployed configuration.
Figure 2:
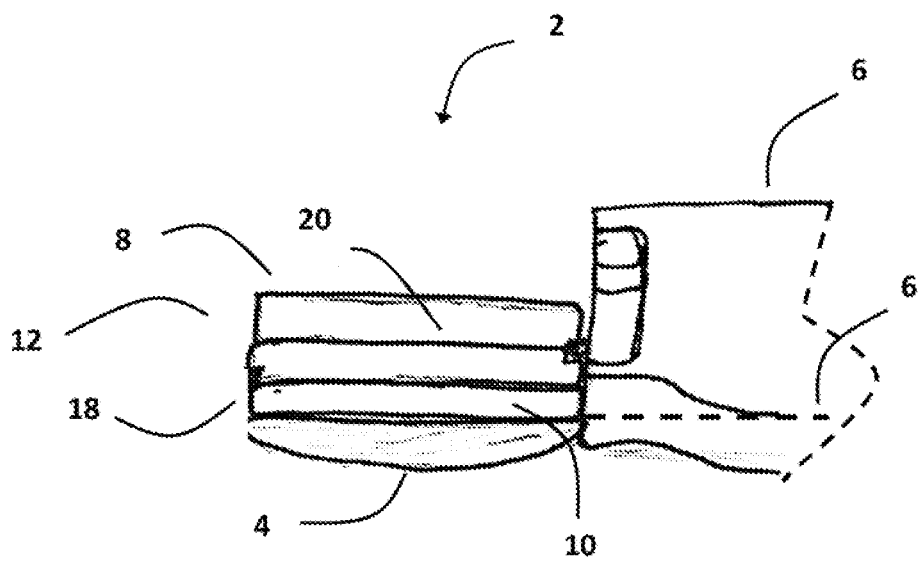
FIG. 2 is a side view of an example embodiment of the table in a stowed configuration.

An embodiment of table 2 according to this invention is shown in FIGS. 1 and 2. In this embodiment the table 2 is attachable to a tailgate 4 of a vehicle 6. The table 2 comprises a plurality of panels 8 that are hingedly attached to one another. As shown in FIG. 2, the first one 10 of the plurality of panels 8 is hingedly attached to the tailgate 4. The panels 8 are foldable relative to one another, between a stowed configuration 12, shown in FIG. 2, and a deployed configuration 14, shown in FIG. 1. In FIG. 1, the plurality of panels form a surface 16, extending from the tailgate 4.

When in a stowed configuration 14, illustrated in FIG. 2, the panels 8 of table 2 accordion fold 18 to lie in facing relation 20 to one another. In this configuration the panels 8 may be secured to the tailgate 4 so that the tailgate 4 may be closed and cargo stored within the vehicle. The panels 8 may be secured to the tailgate 4 by a hook and loop type strap.

As shown in FIG. 1, the table 2 also comprises at least one leg 22 attached to at least one of the plurality of panels. The at least one leg 22 may be attached to a panel distal 24 to the tailgate 4. The at least one leg 22 may be hingedly attached to the panel distal 24 to the tailgate 4.

As also shown in FIG. 1, the table 2 may comprise two legs 26 attached to at least one of said plurality of panels. The two legs 26 may be attached to a panel distal 24 to tailgate 4. The two legs 26 may be hingedly attached to the panel distal 24 to the tailgate 4.

Figure 3A:
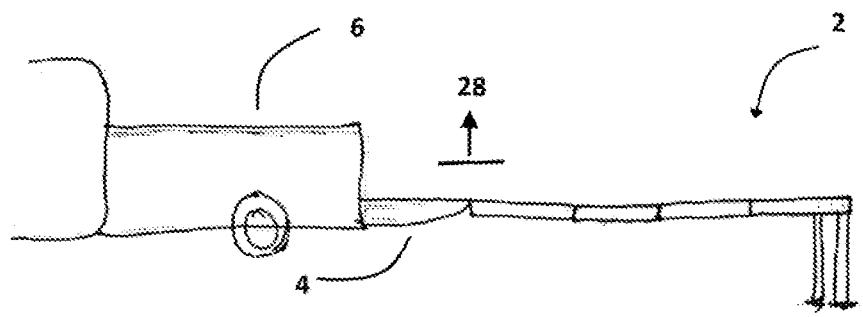
FIG. 3A is a side view of an example embodiment of the table in a deployed configuration.
Figure 3B:
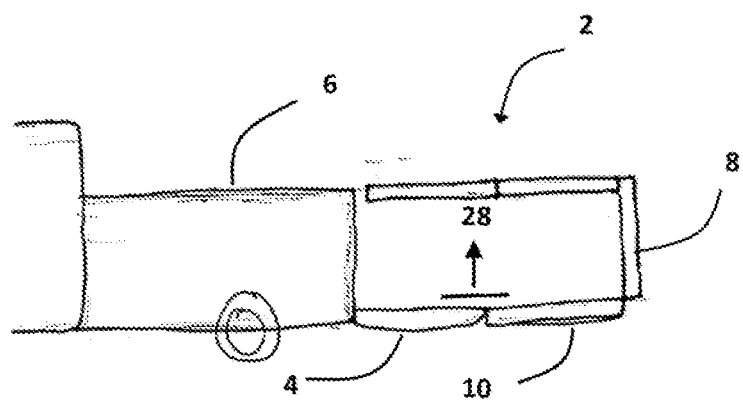
FIG. 3B is a side view of an example embodiment of the table in a transition from deployed configuration to stowed configuration.
Figure 3C:
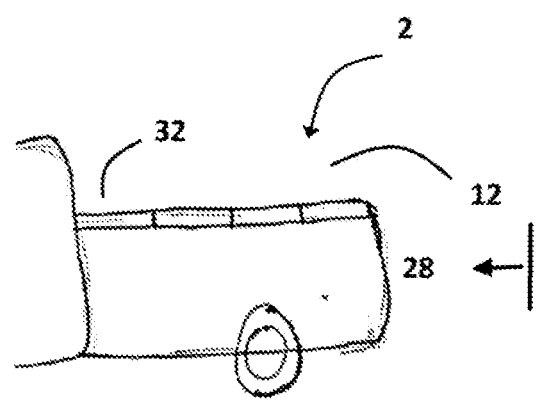
FIG. 3C is a side view of an example embodiment of the table in a stowed configuration.
Figure 4:
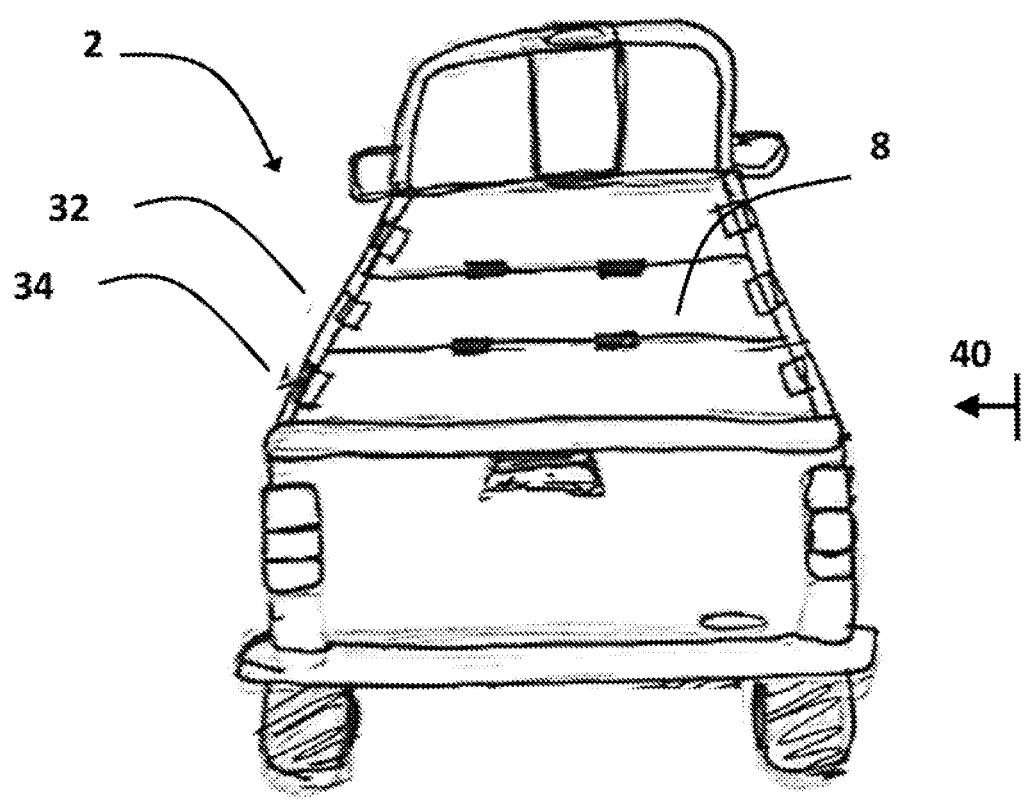
FIG. 4 is a rear perspective view of an example embodiment of the table in a stowed configuration.

An example stowed configuration is illustrated in FIGS. 3C and 4. FIGS. 3A, 3B and 3C illustrate an example transition from the deployed configuration to a stowed configuration 12. In this example, the table 2 acts as a cover for the pickup truck bed, as shown in FIG. 3C. As shown in FIGS. 3A through 3C, the plurality of panels 8 extend transversely 28 to said tailgate 4 when in the stowed configuration 12. In FIG. 3C, the plurality of panels 8 are securable 32 to the vehicle when in the stowed configuration 12. The panels 8 are securable 32 to the vehicle along edges 34 oriented perpendicular to axes 40 of the fold lines between the panels 8, as shown in FIG. 4. Examples of securing include clamps and hook and loop connections. As shown in FIGS. 1 and 4, the panels 8 are hingedly attached edge to edge and the edges are oriented parallel to axes of fold lines 40 between the panels 8.

A deployed configuration is illustrated in FIG. 1. In this deployed configuration table 2 acts as a work surface, for example. As shown in FIG. 1, the plurality of panels 8 extend in the plane 30 of the tailgate when in the deployed configuration 14.

Figure 7:
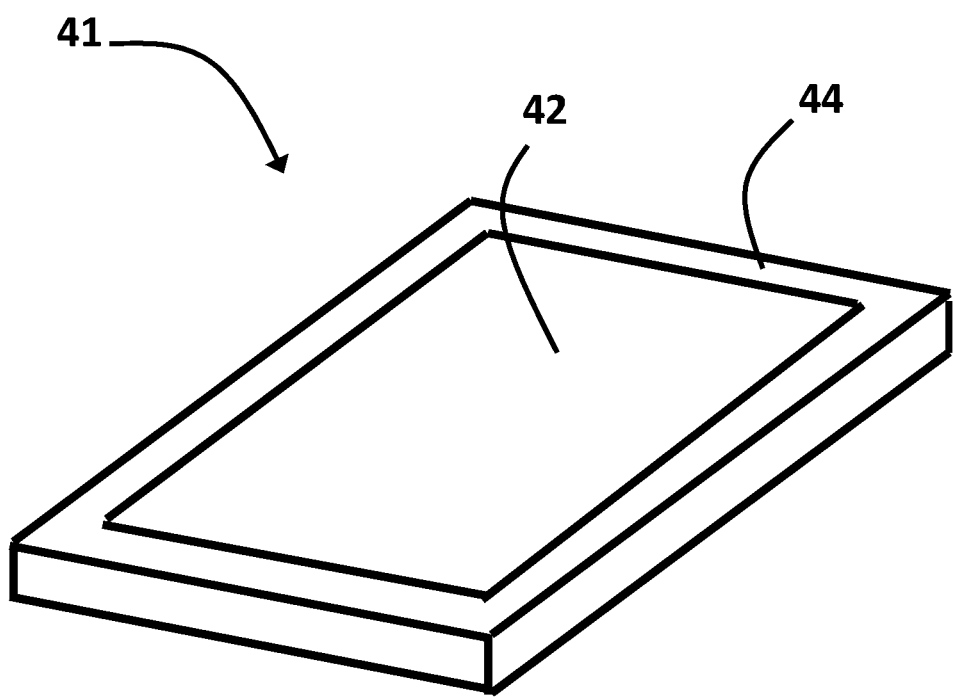
FIG. 7 is an isometric view of an example embodiment of a panel.

As shown in FIG. 7, at least one of the plurality of panels 41 of the table 2 may comprise a rectangular plate 42. The rectangular plate 42 may be constructed of a plastic material, or a composite material, such as fiberglass material. In this example the at least one of the plurality of panels 41 may further comprise a frame 44 surrounding the rectangular plate 42. The frame 44 may be constructed of a metal material such as aluminum. The frame 44 may be adapted to constrain and support the rectangular plate 42. The frame 44 cross section may be a channel.

Figure 5:
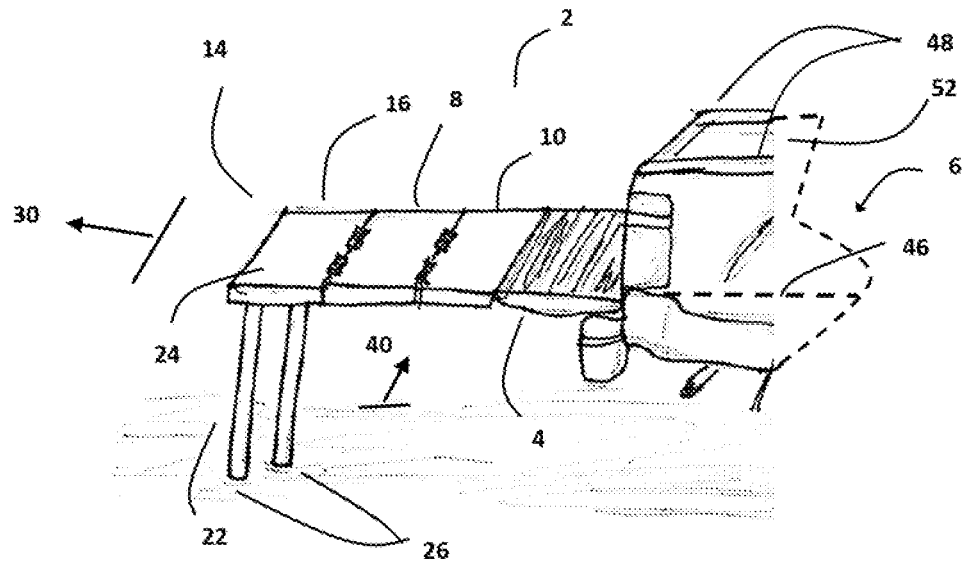
FIG. 5 is an isometric view of an example embodiment of a vehicle and a table in a deployed configuration.
Figure 6:
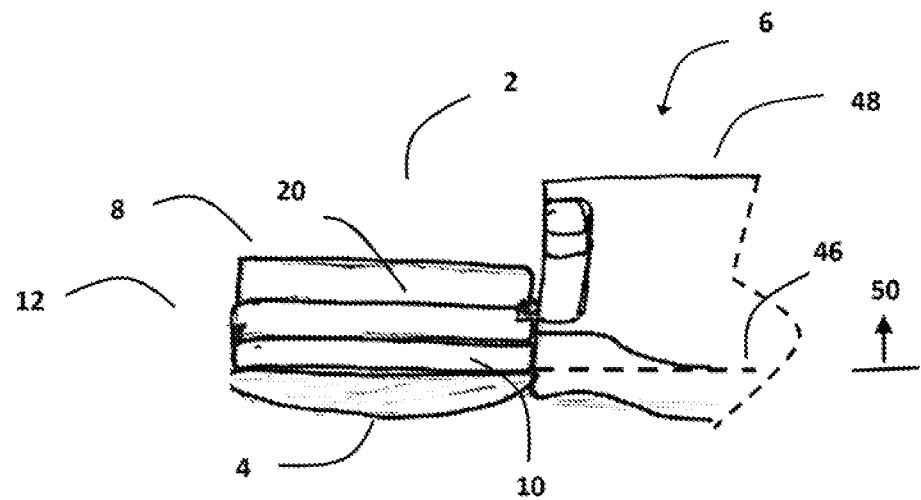
FIG. 6 is a side view of an example embodiment of the vehicle and the table in the stowed configuration.

An embodiment of vehicle 6 according to this invention is shown in FIGS. 5 and 6. In this embodiment vehicle 6, shown in FIG. 5, comprises a platform 46, first and second sides 48, a tailgate 4, and a table 2. As shown in FIG. 6, the first and second sides 48 extend transversely 50 to the platform 46. The first and second sides 48 are in spaced relation 52 to one another on opposite sides of the platform 46. The tailgate 4 is hingedly attached to the platform 46 between the first and second sides 48. The table 2 is hingedly attached to the tailgate 4. The table 2 comprises a plurality of panels 8 hingedly attached to one another. The first one of the panels 10 is hingedly attached to the tailgate 4. The panels 8 are foldable relative to one another, between a stowed configuration 12, shown in FIG. 6, and a deployed configuration 14, shown in FIG. 5. The plurality of panels form a surface 16, extending from the tailgate 4.

The table as described herein is expected to provide a surface and act as a cover protecting the internal cargo from the environment and theft. By using a table attachable to the tailgate of a vehicle extending from the tailgate in two configurations, first, a surface can be created and used for work or staging and using equipment, and second, the surface can be used to cover and protect the cargo from the environment and theft.

What is claimed is:

1. A vehicle, said vehicle comprising:
   a platform;
   first and second sides extending transversely to said platform, said first and second sides being in spaced relation to one another on opposite sides thereof;
   a tailgate hingedly attached to said platform between said first and second sides;
   a table hingedly attached to said tailgate, said table comprising:
   a plurality of panels hingedly attached to one another; and
   a first one of said panels being hingedly attached to said tailgate, said panels being foldable relative to one another, between a stowed configuration, and a deployed configuration,
   wherein said plurality of panels when in said deployed configuration form a surface, extending from said tailgate along a centerline oriented longitudinally along said vehicle,
   wherein said plurality of panels when in said stowed configuration are securable to said vehicle along edges oriented perpendicular to axes of fold lines between said panels, thereby covering said platform.

2. The vehicle according to claim 1, wherein each of said panels, when in said stowed configuration, are accordion folded to lie in facing relation to one another.

3. The vehicle according to claim 1, further comprising at least one leg attached to at least one of said plurality of panels.

4. The vehicle according to claim 3, wherein said at least one leg is attached to a panel distal to said tailgate.

5. The vehicle according to claim 4, wherein said at least one leg is hingedly attached to said panel distal to said tailgate.

6. The vehicle according to claim 1, further comprising two legs attached to at least one of said plurality of panels.

7. The vehicle according to claim 6, wherein said two legs are attached to said panel distal to said tailgate.

8. The vehicle according to claim 7, wherein said two legs are hingedly attached to said panel distal to said tailgate.

9. The vehicle according to claim 1, wherein said plurality of panels extend transversely to said tailgate when in said stowed configuration.

10. The vehicle according to claim 1, wherein said plurality of panels extend in the plane of said tailgate when in said deployed configuration.

11. The vehicle according to claim 1, wherein said plurality of panels are hingedly attached edge to edge, said edges being oriented parallel to axes of fold lines between said panels.

12. The vehicle according to claim 1, wherein at least one of said plurality of panels comprising a rectangular plate.

13. The vehicle according to claim 12, wherein at least one of said plurality of panels further comprises a frame surrounding said rectangular plate.

14. The vehicle according to claim 1, wherein said vehicle is a pick up truck.

\* \* \* \* \*